(12) United States Patent
Wittkopp et al.

(10) Patent No.: US 8,221,281 B2
(45) Date of Patent: Jul. 17, 2012

(54) MULTI-SPEED TRANSMISSION HAVING THREE PLANETARY GEAR SETS

(75) Inventors: Scott H. Wittkopp, Ypsilanti, MI (US); Clinton E. Carey, Highland, MI (US); James M. Hart, Belleville, MI (US); Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/286,894

(22) Filed: Nov. 1, 2011

(65) Prior Publication Data

US 2012/0053007 A1  Mar. 1, 2012

Related U.S. Application Data

(62) Division of application No. 12/355,454, filed on Jan. 16, 2009, now Pat. No. 8,047,953.

(51) Int. Cl.
*F16H 3/44* (2006.01)

(52) U.S. Cl. ........................................ 475/284

(58) Field of Classification Search ............... 475/269, 475/271, 275, 280, 284, 311, 317, 323, 330
See application file for complete search history.

(56) References Cited

U.S. PATENT DOCUMENTS

| | | | |
|---|---|---|---|
| 6,558,287 B2 | 5/2003 | Hayabuchi et al. | |
| 6,634,981 B1 | 10/2003 | Raghavan et al. | |
| 6,659,904 B1 | 12/2003 | Usoro et al. | |
| 6,746,360 B2 | 6/2004 | Bucknor et al. | |
| 6,752,738 B1 | 6/2004 | Martin et al. | |
| 6,860,831 B2 | 3/2005 | Ziemer | |
| 6,910,985 B2 | 6/2005 | Ishimaru et al. | |
| 6,910,986 B2 | 6/2005 | Wittkopp | |
| 6,945,900 B2 | 9/2005 | Usoro | |
| 7,014,590 B2 | 3/2006 | Stevenson | |
| 7,029,416 B2 | 4/2006 | Miyazaki et al. | |
| 7,037,232 B2 | 5/2006 | Ishimaru | |
| 7,101,303 B2 | 9/2006 | Tiesler et al. | |
| 7,104,915 B2 | 9/2006 | Tiesler et al. | |
| 7,115,061 B2 | 10/2006 | Tiesler et al. | |
| 7,115,063 B2 | 10/2006 | Tiesler et al. | |
| 7,118,509 B2 | 10/2006 | Tabata et al. | |
| 7,118,511 B2 | 10/2006 | Tiesler et al. | |
| 7,131,926 B2 | 11/2006 | Tiesler et al. | |
| 7,137,923 B2 | 11/2006 | Tiesler et al. | |
| 7,156,767 B2 | 1/2007 | Tiesler et al. | |
| 2005/0026739 A1 | 2/2005 | Ishimaru | |
| 2006/0068965 A1 | 3/2006 | Gumpoltsberger | |
| 2007/0259753 A1 | 11/2007 | Diosi et al. | |
| 2010/0179016 A1 | 7/2010 | Hart et al. | |
| 2010/0179020 A1 | 7/2010 | Wittkopp et al. | |
| 2010/0184553 A1 | 7/2010 | Wittkopp et al. | |
| 2010/0227730 A1 | 9/2010 | Wittkopp et al. | |

FOREIGN PATENT DOCUMENTS

DE  102004040614  3/2006

*Primary Examiner* — Justin Holmes

(57) ABSTRACT

A transmission is provided having an input member, an output member, three planetary gear sets, a plurality of coupling members and a plurality of torque transmitting devices. Each of the planetary gear sets includes first, second and third members. The torque transmitting devices include clutches and brakes. The torque transmitting mechanisms are selectively engageable in combinations of at least three to establish at least eight forward speed ratios and at least one reverse speed ratio between the input member and the output member.

15 Claims, 12 Drawing Sheets

| GEAR STATE | GEAR RATIO | RATIO STEP | TORQUE TRANSMITTING ELEMENTS | | | | | |
|---|---|---|---|---|---|---|---|---|
| | | | 34 | 36 | 26 | 28 | 30 | 32 |
| Rev | -3.104 | | X | X | | X | | |
| N | | -0.69 | | O | | | | |
| 1st | 4.500 | | | X | | | X | X |
| 2nd | 3.196 | 1.41 | X | X | | | X | |
| 3rd | 2.250 | 1.42 | X | | | | X | X |
| 4th | 1.725 | 1.30 | X | | | X | X | |
| 5th | 1.293 | 1.33 | X | | X | | X | |
| 6th | 1.000 | 1.29 | | | X | X | X | |
| 7th | 0.811 | 1.23 | X | | X | X | | |
| 8th | 0.643 | 1.26 | X | | X | | | X |

X= ON, CARRYING TORQUE
O= ON, NOT CARRYING TORQUE

FIG. 3

| GEAR STATE | GEAR RATIO | RATIO STEP | TORQUE TRANSMITTING ELEMENTS ||||||
|---|---|---|---|---|---|---|---|---|
| | | | 134 | 136 | 126 | 128 | 130 | 132 |
| Rev | -3.129 | | X | X | | X | | |
| N | | -0.69 | | O | | | | |
| 1st | 4.518 | | | X | | | X | X |
| 2nd | 3.189 | 1.42 | X | X | | | X | |
| 3rd | 2.256 | 1.41 | X | | | | X | X |
| 4th | 1.738 | 1.30 | X | | | X | X | |
| 5th | 1.301 | 1.34 | X | | X | | X | |
| 6th | 1.000 | 1.30 | | | X | X | X | |
| 7th | 0.809 | 1.24 | X | | X | X | | |
| 8th | 0.643 | 1.26 | X | | X | | | X |

X= ON, CARRYING TORQUE
O= ON, NOT CARRYING TORQUE

FIG. 6

| GEAR STATE | GEAR RATIO | RATIO STEP | TORQUE TRANSMITTING ELEMENTS ||||||
|---|---|---|---|---|---|---|---|---|
| | | | 228 | 226 | 230 | 232 | 236 | 234 |
| Rev | -5.719 | | X | | | X | | |
| N | | -0.96 | | | | O | | |
| 1st | 5.987 | | | | | X | | X |
| 2nd | 3.639 | 1.65 | | X | | X | | |
| 3rd | 2.348 | 1.55 | | | X | | | X |
| 4th | 1.435 | 1.64 | X | | | | | X |
| 5th | 1.000 | 1.43 | | | | | X | X |
| 6th | 0.836 | 1.20 | X | | | | X | |
| 7th | 0.730 | 1.15 | | | X | | X | |
| 8th | 0.608 | 1.20 | | X | | | X | |

X = ON, CARRYING TORQUE
O = ON, NOT CARRYING TORQUE

FIG. 9

| GEAR STATE | GEAR RATIO | RATIO STEP | TORQUE TRANSMITTING ELEMENTS | | | | | |
|---|---|---|---|---|---|---|---|---|
| | | | 332 | 334 | 336 | 328 | 326 | 330 |
| Rev | -3.470 | | | X | | | X | X |
| N | | -0.64 | | | | | | |
| 1st | 5.442 | | X | X | | | | X |
| 2nd | 3.553 | 1.53 | | X | | X | | X |
| 3rd | 2.406 | 1.48 | X | | X | | | X |
| 4th | 1.571 | 1.53 | | | X | X | | X |
| 5th | 1.284 | 1.22 | X | | | | X | X |
| 6th | 1.000 | 1.28 | | | | X | X | X |
| 7th | 0.937 | 1.07 | X | | X | | X | |
| 8th | 0.776 | 1.21 | | | X | X | X | |

X= ON, CARRYING TORQUE
O= ON, NOT CARRYING TORQUE

FIG. 12

| GEAR STATE | GEAR RATIO | RATIO STEP | TORQUE TRANSMITTING ELEMENTS | | | | | |
|---|---|---|---|---|---|---|---|---|
| | | | 434 | 432 | 436 | 428 | 426 | 430 |
| Rev | -2.850 | | X | | X | | | X |
| N | | -0.67 | O | | O | | | |
| 1st | 4.279 | | X | | X | | X | |
| 2nd | 2.731 | 1.57 | | X | X | | X | |
| 3rd | 1.699 | 1.61 | | | X | | X | X |
| 4th | 1.344 | 1.26 | | | X | X | X | |
| 5th | 1.182 | 1.14 | | | X | X | | X |
| 6th | 1.000 | 1.18 | | | | X | X | X |
| 7th | 0.709 | 1.41 | | X | X | X | | |
| 8th | 0.608 | 1.17 | X | | X | X | | |

X= ON, CARRYING TORQUE
O= ON, NOT CARRYING TORQUE

FIG. 15

| GEAR STATE | GEAR RATIO | RATIO STEP | TORQUE TRANSMITTING ELEMENTS ||||||
|---|---|---|---|---|---|---|---|---|
| | | | 536 | 534 | 532 | 530 | 528 | 526 |
| Rev | -3.060 | | | X | | | X | X |
| N | | -0.68 | | O | | | | O |
| 1st | 4.523 | | X | X | | | | X |
| 2nd | 3.094 | 1.46 | | X | | X | | X |
| 3rd | 2.216 | 1.40 | X | | X | | | X |
| 4th | 1.516 | 1.46 | | | X | X | | X |
| 5th | 1.263 | 1.20 | X | | | | X | X |
| 6th | 1.000 | 1.26 | | | | X | X | X |
| 7th | 0.894 | 1.12 | X | | X | | X | |
| 8th | 0.754 | 1.19 | | | X | X | X | |

X= ON, CARRYING TORQUE
O= ON, NOT CARRYING TORQUE

FIG. 18

MULTI-SPEED TRANSMISSION HAVING THREE PLANETARY GEAR SETS

CROSS-REFERENCE TO RELATED APPLICATIONS

This application is a divisional of U.S. patent application Ser. No. 12/355,454 filed on Jan. 16, 2009. The disclosure of the above application is incorporated herein by reference.

FIELD

The invention relates generally to a multiple speed transmission having a plurality of planetary gear sets and a plurality of torque transmitting devices, and more particularly to a transmission having eight speeds, three planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets, a plurality of coupling members and a plurality of torque transmitting devices. Each of the planetary gear sets includes first, second and third members. The torque transmitting devices are for example clutches and brakes.

In one embodiment of the transmission, each of the planetary gear sets has a sun gear, carrier and ring gear members.

In another embodiment of the transmission, the torque transmitting devices include four clutches and two brakes.

In yet another embodiment of the transmission, the torque transmitting devices include four brakes and two clutches.

In yet another embodiment of the transmission, the torque transmitting devices includes three clutches and three brakes.

In yet another embodiment of the transmission, the transmission includes at least two fixed interconnecting members between the first, second, and third members of the first, second, and third planetary gear sets.

Thus, it is an object of the present invention to provide a transmission having at least eight forward speeds and at least one reverse.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting mechanisms in each of the available forward and reverse speeds or gear ratios of the transmission illustrated in FIGS. 1 and 2;

FIG. 6 is a truth table presenting the state of engagement of the various torque transmitting mechanisms in each of the available forward and reverse speeds or gear ratios of the transmission illustrated in FIGS. 4 and 5;

FIG. 9 is a truth table presenting the state of engagement of the various torque transmitting mechanisms in each of the available forward and reverse speeds or gear ratios of the transmission illustrated in FIGS. 7 and 8;

FIG. 12 is a truth table presenting the state of engagement of the various torque transmitting mechanisms in each of the available forward and reverse speeds or gear ratios of the transmission illustrated in FIGS. 10 and 11;

FIG. 15 is a truth table presenting the state of engagement of the various torque transmitting mechanisms in each of the available forward and reverse speeds or gear ratios of the transmission illustrated in FIGS. 13 and 14;

FIG. 18 is a truth table presenting the state of engagement of the various torque transmitting mechanisms in each of the available forward and reverse speeds or gear ratios of the transmission illustrated in FIGS. 16 and 17.

DETAILED DESCRIPTION

The following description is merely exemplary in nature and is not intended to limit the present disclosure, application, or uses.

Figure 1:
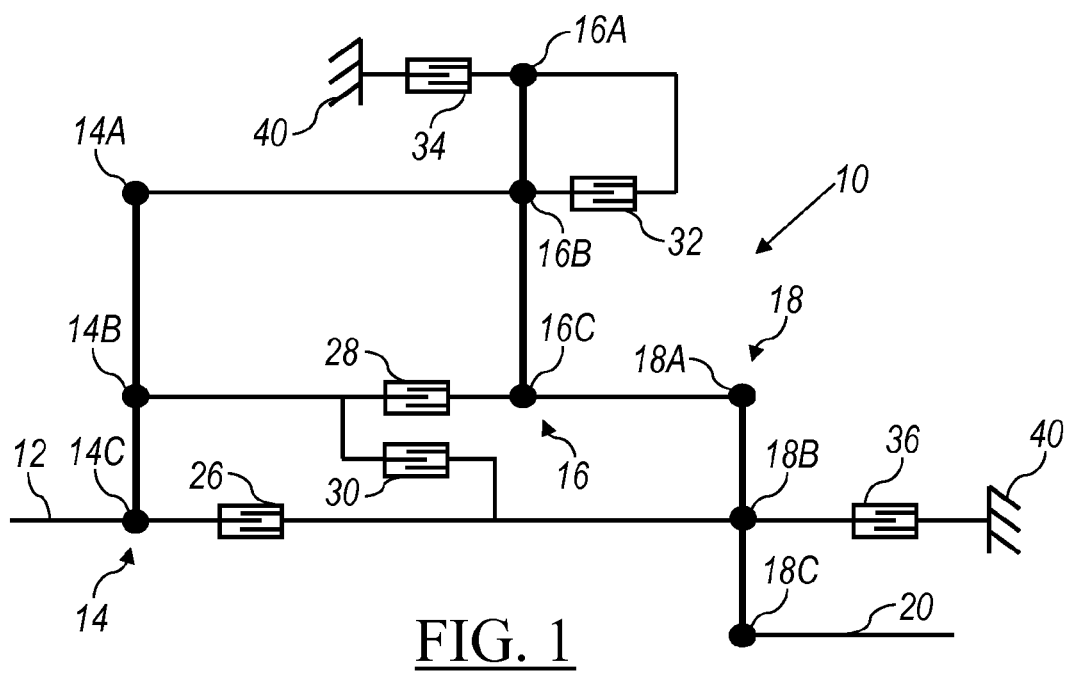
FIG. 1 is a lever diagram of an embodiment of an eight speed transmission according to the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, and an output shaft or member 20.

The input shaft or member 12 is coupled to the third node 14C of the first planetary gear set 14. The output shaft or member 20 is coupled to the third node 18C of the third planetary gear set 18. The first node 14A of the first planetary gear set 14 is coupled to the second node 16B of the second planetary gear set 16. The third node 16C of the second planetary gear set 16 is coupled to the first node 18A of the third planetary gear set 18.

A first clutch 26 selectively connects the input shaft or member 12 and the third node 14C of the first planetary gear set 14 with the second node 18B of the third planetary gear set 18. A second clutch 28 selectively connects the second node 14B of the first planetary gear set 14 with the third node 16C of the second planetary gear set 16 and the first node 18A of the third planetary gear set 18. A third clutch 30 selectively connects the second node 14B of the first planetary gear set 14 with the second node 18B of the third planetary gear set 18. A fourth clutch 32 selectively connects the second node 16B of the second planetary gear set 16 and the first node 14A of the first planetary gear set 14 with the first node 16A of the second planetary gear set 16. A first brake 34 selectively connects the first node 16A of the second planetary gear set 16 with a ground, a stationary member, or a transmission housing 40. A second brake 36 selectively connects the second node 18B of the third planetary gear set 18 with the ground, the stationary member, or the transmission housing 40.

Figure 2:
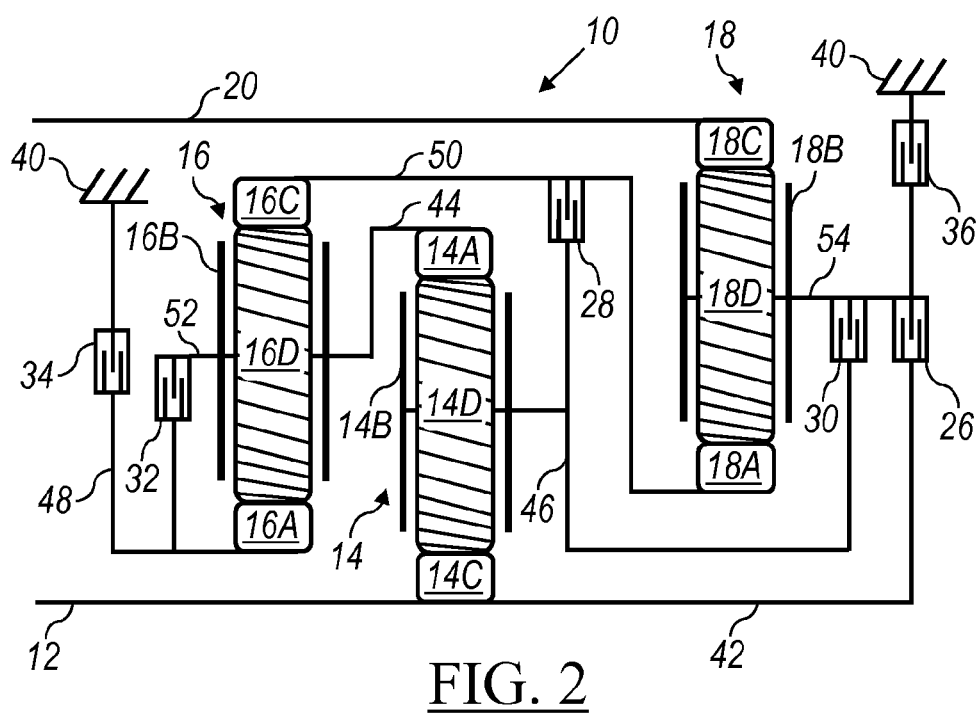
FIG. 2 is a diagrammatic view of an embodiment of an eight speed transmission according to the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches, brakes, and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14C, a ring gear member 14A and a planet gear carrier member 14B that rotatably supports a set of planet gears 14D (only one of which is shown). The sun gear member 14C is connected for common rotation with a first shaft or interconnecting member 42 and with the input shaft or member 12. The ring gear member 14A is connected for common rotation with a second shaft or interconnecting member 44. The planet carrier member 14B is connected for common rotation with a third shaft or interconnecting member 46. The planet gears 14D each are configured to intermesh with both the sun gear member 14C and the ring gear member 14A.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with and a fourth shaft or interconnecting member 48. The ring gear member 16C is connected for common rotation with a fifth shaft or interconnecting member 50. The planet carrier member 16B is connected for common rotation with the second shaft or interconnecting member 44 and a sixth shaft or interconnecting member 52. The planet gears 16D each are configured to intermesh with both the sun gear member 16A and the ring gear member 16C.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with the fifth shaft or interconnecting member 50. The ring gear member 18C is connected for common rotation with the output shaft or member 20. The planet carrier member 18B is connected for common rotation with a seventh shaft or interconnecting member 54. The planet gears 18D each are configured to intermesh with both the sun gear member 18A and the ring gear member 18C.

The input shaft or member 12 is continuously connected to an engine (not shown) or to a turbine of a torque converter (not shown). The output shaft or member 20 is continuously connected with the final drive unit or transfer case (not shown).

The torque-transmitting mechanisms or clutches 26, 28, 30, 32 and brakes 34 and 36 allow for selective interconnection of the shafts or interconnecting members, members of the planetary gear sets and the housing. For example, the first clutch 26 is selectively engageable to connect the first shaft or interconnecting member 42 and the input shaft or member 12 with the seventh shaft or interconnecting member 54. The second clutch 28 is selectively engageable to connect the third shaft or interconnecting member 46 with the fifth shaft or interconnecting member 50. The third clutch 30 is selectively engageable to connect the third shaft or interconnecting member 46 with the seventh shaft or interconnecting member 54. The fourth clutch 32 is selectively engageable to connect the fourth shaft or interconnecting member 48 with the second shaft or interconnecting member 44 and the sixth shaft or interconnecting member 52. The first brake 34 is selectively engageable to connect the fourth shaft or interconnecting member 48 with the stationary member or the transmission housing 40 in order to restrict the fourth interconnecting member 48 from rotating relative to the transmission housing 40. The second brake 36 is selectively engageable to connect the seventh shaft or interconnecting member 54 with the stationary member or the transmission housing 40 in order to restrict the fifth interconnecting member 54 from rotating relative to the transmission housing 40.

Referring now to FIG. 2 and FIG. 3, the operation of the embodiment of the eight speed transmission 10 will be described. It will be appreciated that transmission 10 is capable of transmitting torque from the input shaft or member 12 to the output shaft or member 20 in at least eight forward speed or torque ratios and at least one reverse speed or torque ratio with single transition sequential shifts and a double overdrive. Each forward and reverse speed or torque ratio is attained by engagement of one or more of the torque-transmitting mechanisms (i.e. first clutch 26, second clutch 28, third clutch 30, fourth clutch 32, first brake 34 and second brake 36), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish a reverse gear, the second clutch 28, first brake 34 and second brake 36 are engaged or activated. The second clutch 28 connects the third shaft or interconnecting member 46 with the fifth shaft or interconnecting member 50. The first brake 34 connects the fourth shaft or interconnecting member 48 with the stationary member or the transmission housing 40 in order to restrict the fourth interconnecting member 48 from rotating relative to the transmission housing 40. The second brake 36 connects the seventh shaft or interconnecting member 54 with the stationary member or the transmission housing 40 in order to restrict the fifth interconnecting member 54 from rotating relative to the transmission housing 40. Likewise, the eight forward ratios are achieved through different combinations of clutch and brake engagement, as shown in FIG. 3.

It will be appreciated that the foregoing explanation of operation and gear states of the eight speed transmission 10 assumes, first of all, that all the clutches or brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Figure 4:
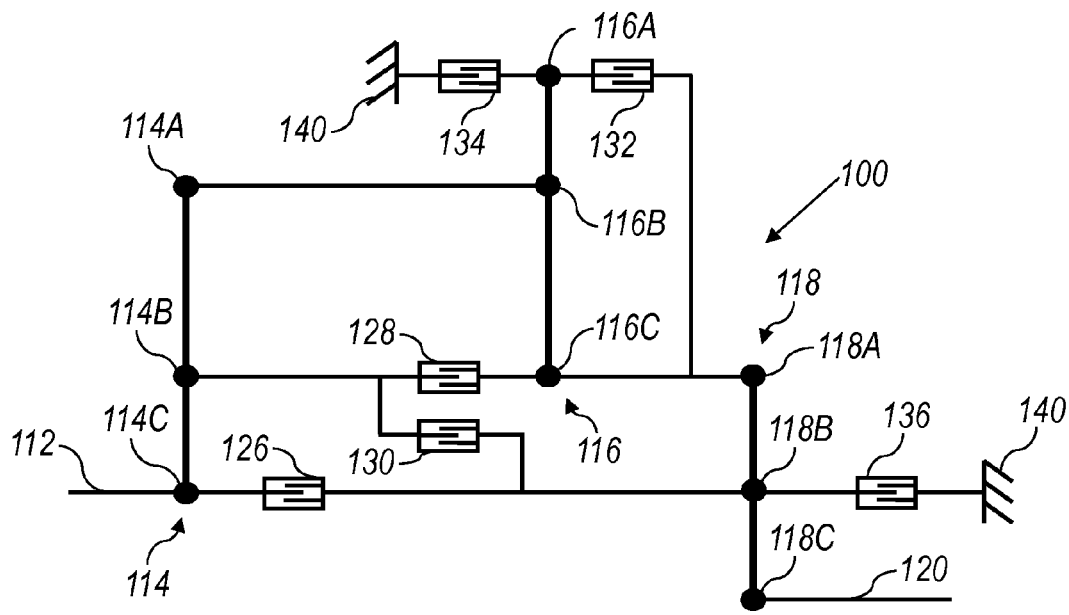
FIG. 4 is a lever diagram of an embodiment of an eight speed transmission according to the present invention.

Referring now to FIG. 4, another embodiment of an eight speed transmission 100 is illustrated in a lever diagram format. The transmission 100 includes an input shaft or member 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 118B and a third node 118C, and an output shaft or member 120.

The input shaft or member 112 is coupled to the third node 114C of the first planetary gear set 114. The output shaft or member 120 is coupled to the third node 118C of the third planetary gear set 118. The first node 114A of the first planetary gear set 114 is coupled to the second node 116B of the second planetary gear set 116. The third node 116C of the second planetary gear set 116 is coupled to the first node 118A of the third planetary gear set 118.

A first clutch 126 selectively connects the input shaft or member 112 and the third node 114C of the first planetary gear set 114 with the second node 118B of the third planetary gear set 118. A second clutch 128 selectively connects the second node 114B of the first planetary gear set 114 with the third node 116C of the second planetary gear set 116 and the first node 118A of the third planetary gear set 118. A third clutch 130 selectively connects the second node 114B of the first planetary gear set 114 with the second node 118B of the third planetary gear set 118. A fourth clutch 132 selectively connects the first node 116A of the second planetary gear set 116 with the third node 116C of the second planetary gear set 116 and the first node 118A of the third planetary gear set 118. A first brake 134 selectively connects the first node 116A of the second planetary gear set 116 with a ground, a stationary member, or a transmission housing 140. A second brake 136 selectively connects the second node 118B of the third planetary gear set 118 with the ground, the stationary member, or the transmission housing 140.

Figure 5:
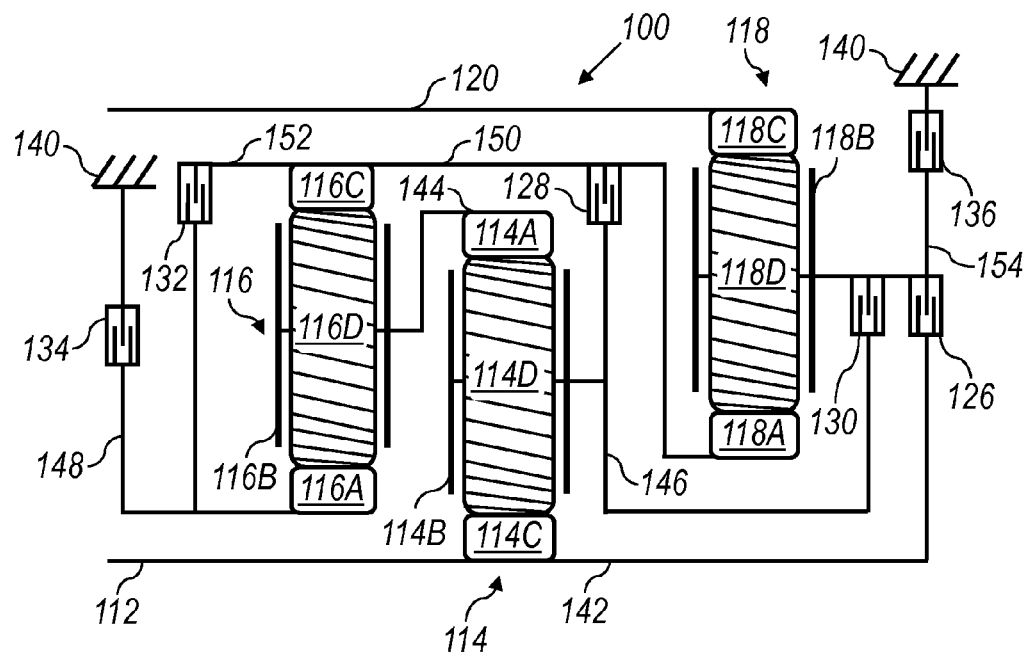
FIG. 5 is a diagrammatic view of an embodiment of an eight speed transmission according to the present invention.

Referring now to FIG. 5, a stick diagram presents a schematic layout of the embodiment of the eight speed transmission 100 according to the present invention. In FIG. 5, the numbering from the lever diagram of FIG. 4 is carried over. The clutches, brakes, and couplings are correspondingly presented whereas the nodes of the planetary gear sets now appear as components of planetary gear sets such as sun gears, ring gears, planet gears and planet gear carriers.

For example, the planetary gear set 114 includes a sun gear member 114C, a ring gear member 114A and a planet gear carrier member 114B that rotatably supports a set of planet gears 114D (only one of which is shown). The sun gear member 114C is connected for common rotation with a first shaft or interconnecting member 142 and with the input shaft or member 112. The ring gear member 114A is connected for common rotation with a second shaft or interconnecting member 144. The planet carrier member 114B is connected for common rotation with a third shaft or interconnecting member 146. The planet gears 114D each are configured to intermesh with both the sun gear member 114C and the ring gear member 114A.

The planetary gear set 116 includes a sun gear member 116A, a ring gear member 116C and a planet gear carrier member 116B that rotatably supports a set of planet gears 116D (only one of which is shown). The sun gear member 116A is connected for common rotation with and a fourth shaft or interconnecting member 148. The ring gear member 116C is connected for common rotation with a fifth shaft or interconnecting member 150 and a sixth shaft or interconnecting member 152. The planet carrier member 116B is connected for common rotation with the second shaft or interconnecting member 144. The planet gears 116D each are configured to intermesh with both the sun gear member 116A and the ring gear member 116C.

The planetary gear set 118 includes a sun gear member 118A, a ring gear member 118C and a planet gear carrier member 118B that rotatably supports a set of planet gears 118D (only one of which is shown). The sun gear member 118A is connected for common rotation with the fifth shaft or interconnecting member 150. The ring gear member 118C is connected for common rotation with the output shaft or member 120. The planet carrier member 118B is connected for common rotation with a seventh shaft or interconnecting member 154. The planet gears 118D are configured to each intermesh with both the sun gear member 118A and the ring gear member 118C.

The input shaft or member 112 is continuously connected to an engine (not shown) or to a turbine of a torque converter (not shown). The output shaft or member 120 is continuously connected with the final drive unit or transfer case (not shown).

The torque-transmitting mechanisms or clutches 126, 128, 130, 132 and brakes 134 and 136 allow for selective interconnection of the shafts or interconnecting members, members of the planetary gear sets and the housing. For example, the first clutch 126 is selectively engageable to connect the first shaft or interconnecting member 142 and the input shaft or member 112 with the seventh shaft or interconnecting member 154. The second clutch 128 is selectively engageable to connect the third shaft or interconnecting member 146 with the fifth shaft or interconnecting member 150 and the sixth shaft or interconnecting member 152. The third clutch 130 is selectively engageable to connect the third shaft or interconnecting member 146 with the seventh shaft or interconnecting member 154. The fourth clutch 132 is selectively engageable to connect the fourth shaft or interconnecting member 148 with the fifth shaft or interconnecting member 150 and the sixth shaft or interconnecting member 152. The first brake 134 is selectively engageable to connect the fourth shaft or interconnecting member 148 with the stationary member or the transmission housing 140 in order to restrict the fourth interconnecting member 148 from rotating relative to the transmission housing 140. The second brake 136 is selectively engageable to connect the seventh shaft or interconnecting member 154 with the stationary member or the transmission housing 140 in order to restrict the fifth interconnecting member 154 from rotating relative to the transmission housing 140.

Referring now to FIG. 5 and FIG. 6, the operation of the embodiment of the eight speed transmission 100 will be described. It will be appreciated that transmission 100 is capable of transmitting torque from the input shaft or member 112 to the output shaft or member 120 in at least eight forward speed or torque ratios and at least one reverse speed or torque ratio with single transition sequential shifts and a double overdrive. Each forward and reverse speed or torque ratio is attained by engagement of one or more of the torque-transmitting mechanisms (i.e. first clutch 126, second clutch 128, third clutch 130, fourth clutch 132, first brake 134 and second brake 136), as will be explained below. FIG. 6 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 100. An example of the gear ratios that may be obtained using the embodiments of the present invention are also shown in FIG. 6. Of course, other gear ratios are achievable depending on the gear diameter, gear teeth count and gear configuration selected.

To establish a reverse gear, the second clutch 128, first brake 134 and second brake 136 are engaged or activated. The second clutch 128 connects the third shaft or interconnecting member 146 with the fifth shaft or interconnecting member 150 and the sixth shaft or interconnecting member 152. The first brake 134 connects the fourth shaft or interconnecting member 148 with the stationary member or the transmission housing 140 in order to restrict the fourth interconnecting member 148 from rotating relative to the transmission housing 140. The second brake 136 connects the seventh shaft or interconnecting member 154 with the stationary member or the transmission housing 140 in order to restrict the fifth interconnecting member 154 from rotating relative to the transmission housing 140. Likewise, the eight forward ratios are achieved through different combinations of clutch and brake engagement, as shown in FIG. 6.

It will be appreciated that the foregoing explanation of operation and gear states of the eight speed transmission 100 assumes, first of all, that all the clutches or brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Figure 7:
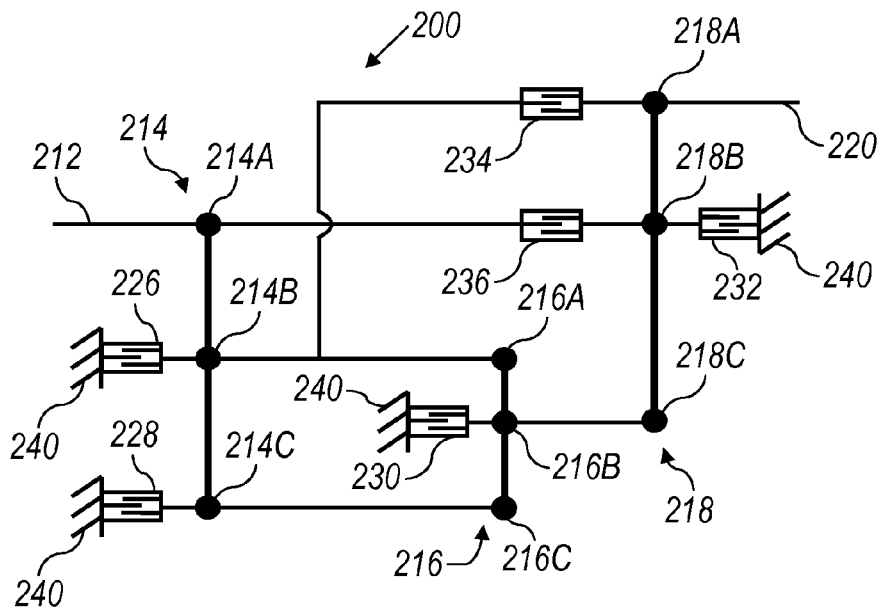
FIG. 7 is a lever diagram of an embodiment of an eight speed transmission according to the present invention.

Referring now to FIG. 7, another embodiment of an eight speed transmission 200 is illustrated in a lever diagram format. The transmission 200 includes an input shaft or member 212, a first planetary gear set 214 having three nodes: a first node 214A, a second node 214B and a third node 214C, a second planetary gear set 216 having three nodes: a first node 216A, a second node 216B and a third node 216C, a third planetary gear set 218 having three nodes: a first node 218A, a second node 218B and a third node 218C, and an output shaft or member 220.

The input shaft or member 212 is coupled to the first node 214A of the first planetary gear set 214. The output shaft or member 220 is coupled to the first node 218A of the third planetary gear set 218. The second node 214B of the first planetary gear set 214 is coupled to the first node 216A of the second planetary gear set 216. The third node 214C of the first planetary gear set 214 is coupled to the third node 216C of the second planetary gear set 216. The second node 216B of the second planetary gear set 216 is coupled to the third node 218C of the third planetary gear set 218.

A first brake 226 selectively connects the second node 214B of the first planetary gear set 214 and the first node 216A of the second planetary gear set 216 with a ground, a stationary member, or a transmission housing 240. A second brake 228 selectively connects the third node 214C of the first planetary gear set 214 and the third node 216C of the second planetary gear set 216 with the ground, the stationary member, or the transmission housing 240. A third brake 230 selectively connects the second node 216B of the second planetary gear set 216 and the third node 218C of the third planetary gear set 218 with the ground, the stationary member, or the transmission housing 240. A fourth brake 232 selectively connects the second node 218B of the third planetary gear set 218 with the ground, the stationary member, or the transmission housing 240. A first clutch 234 selectively connects the second node 214B of the first planetary gear set 214 and the first node 216A of the second planetary gear set 216 with the first node 218A of the third planetary gear set 218 and the output shaft or member 220. A second clutch 236 selectively connects the first node 214A of the first planetary gear set 214 and the input shaft or member 212 with the second node 218B of the third planetary gear set 218.

Figure 8:
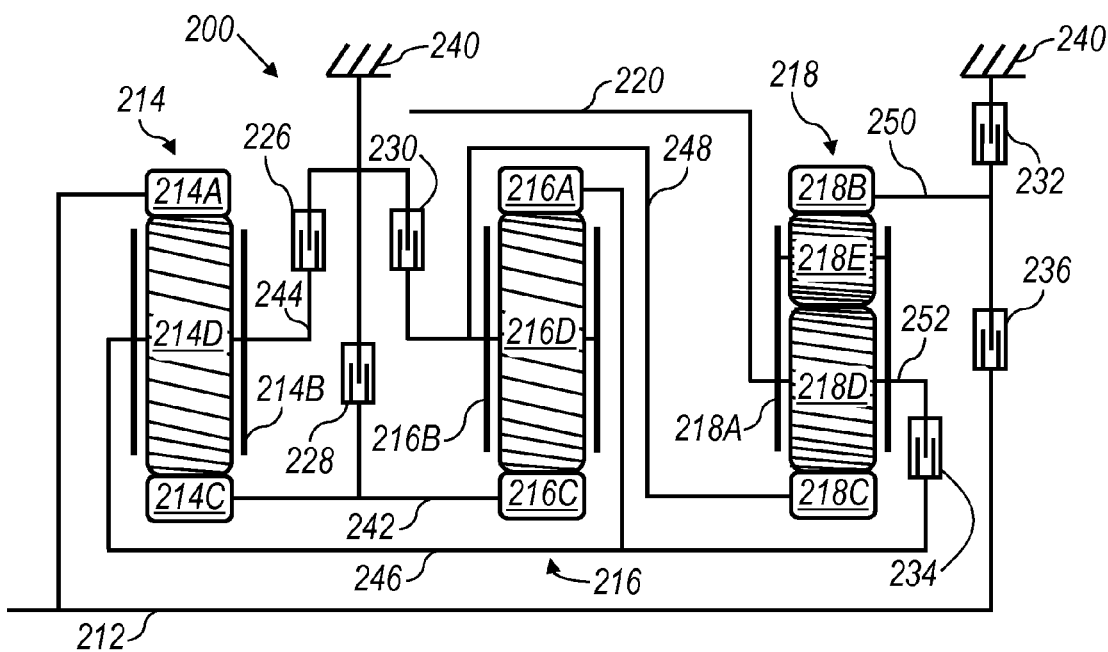
FIG. 8 is a diagrammatic view of an embodiment of an eight speed transmission according to the present invention.

Referring now to FIG. 8, a stick diagram presents a schematic layout of the embodiment of the eight speed transmission 200 according to the present invention. In FIG. 8, the numbering from the lever diagram of FIG. 7 is carried over. The clutches, brakes, and couplings are correspondingly presented whereas the nodes of the planetary gear sets now appear as components of planetary gear sets such as sun gears, ring gears, planet gears and planet gear carriers.

For example, the planetary gear set 214 includes a sun gear member 214C, a ring gear member 214A and a planet gear carrier member 214B that rotatably supports a set of planet gears 214D (only one of which is shown). The sun gear member 214C is connected for common rotation with a first shaft or interconnecting member 242. The ring gear member 214A is connected for common rotation with the input shaft or member 212. The planet carrier member 214B is connected for common rotation with a second shaft or interconnecting member 244 and a third shaft or interconnecting member 246. The planet gears 214D are configured to each intermesh with both the sun gear member 214C and the ring gear member 214A.

The planetary gear set 216 includes a sun gear member 216C, a ring gear member 216A and a planet gear carrier member 216B that rotatably supports a set of planet gears 216D (only one of which is shown). The sun gear member 216C is connected for common rotation with the first shaft or interconnecting member 242. The ring gear member 216A is connected for common rotation with the third shaft or interconnecting member 246. The planet carrier member 216B is connected for common rotation with a fourth shaft or interconnecting member 248. The planet gears 216D are configured to each intermesh with both the sun gear member 216C and the ring gear member 216A.

The planetary gear set 218 includes a sun gear member 218C, a ring gear member 218B and a planet gear carrier member 218A that rotatably supports a first set of planet gears 218D (only one of which is shown) and a second set of planet gears 218E (only one of which is shown). The sun gear member 218C is connected for common rotation with the fourth shaft or interconnecting member 248. The ring gear member 218B is connected for common rotation with a fifth shaft or interconnecting member 250. The planet carrier member 218A is connected for common rotation with a sixth shaft or interconnecting member 252 and the output shaft or member 220. The planet gears 218D are each configured to intermesh with both the sun gear member 218C and the planet gears 218E. The planet gears 218E are each configured to intermesh with both the ring gear member 218B and the planet gears 218D.

The input shaft or member 212 is continuously connected to an engine (not shown) or to a turbine of a torque converter (not shown). The output shaft or member 220 is continuously connected with the final drive unit or transfer case (not shown).

The torque-transmitting mechanisms 226, 228, 230, 232, 234 and 236 allow for selective interconnection of the shafts or interconnecting members, members of the planetary gear sets and the housing. For example, the first brake 226 is selectively engageable to connect the second shaft or interconnecting member 244 and the third shaft or interconnecting member 246 with the stationary member or the transmission housing 240 in order to restrict the members 244, 246 from rotating relative to the transmission housing 240. The second brake 228 is selectively engageable to connect the first shaft or interconnecting member 242 with the stationary member or the transmission housing 240 in order to restrict the member 242 from rotating relative to the transmission housing 240. The third brake 230 is selectively engageable to connect the fourth shaft or interconnecting member 248 with the stationary member or the transmission housing 240 in order to restrict the member 248 from rotating relative to the transmission housing 240. The fourth brake 232 is selectively engageable to connect the fifth shaft or interconnecting member 250 with the stationary member or the transmission housing 240 in order to restrict the member 250 from rotating relative to the transmission housing 240. The first clutch 234 is selectively engageable to connect the second shaft or interconnecting member 244 and the third shaft or interconnecting member 246 with the sixth shaft or interconnecting member 252 and the output shaft or member 220. The second clutch 236 is selectively engageable to connect the input shaft or member 212 with fifth shaft or interconnecting member 250.

Referring now to FIG. 8 and FIG. 9, the operation of the embodiment of the eight speed transmission 200 will be described. It will be appreciated that transmission 200 is capable of transmitting torque from the input shaft or member 212 to the output shaft or member 220 in at least eight forward speed or torque ratios and at least one reverse speed or torque ratio and a double overdrive. The 2-3 shift is a double transition shift requiring two torque transmitting mechanisms to release and two different torque transmitting mechanisms to apply. Each forward and reverse speed or torque ratio is attained by engagement of one or more of the torque transmitting mechanisms, as will be explained below. FIG. 9 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 200. An example of the gear ratios that may be obtained using the embodiments of the present invention are also shown in FIG. 9. Of course, other gear ratios are achievable depending on the gear diameter, gear teeth count and gear configuration selected.

To establish a reverse gear, the second brake 228 and the fourth brake 232 are engaged or activated. The second brake 228 connects the first shaft or interconnecting member 242 with the stationary member or the transmission housing 240 in order to restrict the member 242 from rotating relative to the transmission housing 240. The fourth brake 232 connects the fifth shaft or interconnecting member 250 with the stationary member or the transmission housing 240 in order to restrict the member 250 from rotating relative to the transmission housing 240. Likewise, the eight forward ratios are achieved through different combinations of clutch and brake engagement, as shown in FIG. 9.

It will be appreciated that the foregoing explanation of operation and gear states of the eight speed transmission 200 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Figure 10:
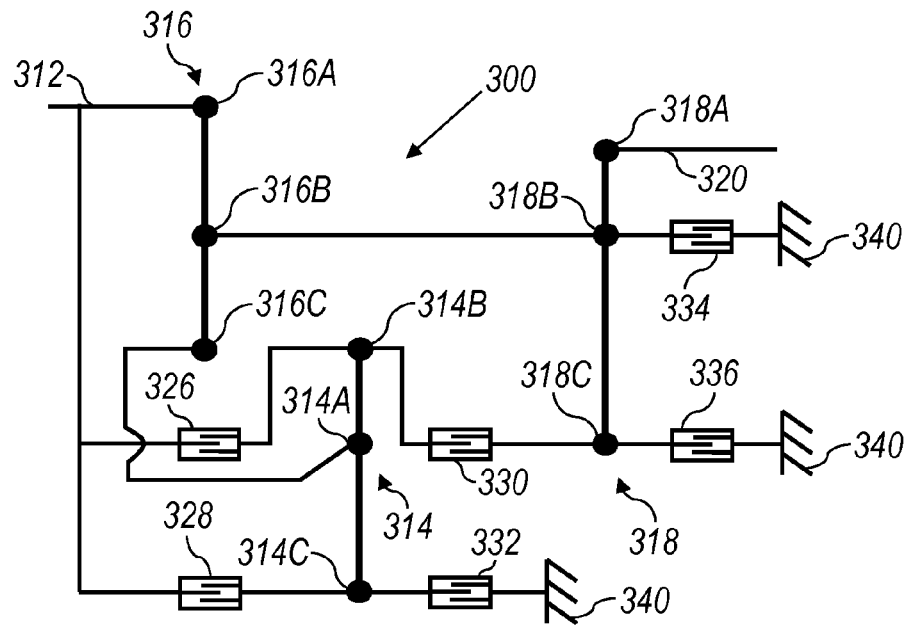
FIG. 10 is a lever diagram of an embodiment of an eight speed transmission according to the present invention.

Referring now to FIG. 10, yet another embodiment of an eight speed transmission 300 is illustrated in a lever diagram format. The transmission 300 includes an input shaft or member 312, a first planetary gear set 314 having three nodes: a first node 314A, a second node 314B and a third node 314C, a second planetary gear set 316 having three nodes: a first node 316A, a second node 316B and a third node 316C, a third planetary gear set 318 having three nodes: a first node 318A, a second node 318B and a third node 318C, and an output shaft or member 320.

The input shaft or member 312 is coupled to the first node 316A of the second planetary gear set 316. The output shaft or member 320 is coupled to the first node 318A of the third planetary gear set 318. The second node 316B of the second planetary gear set 316 is coupled to the second node 318B of the third planetary gear set 318. The third node 316C of the second planetary gear set 316 is coupled to the first node 314A of the first planetary gear set 314.

A first clutch 326 selectively connects the input shaft or member 312 and the first node 316A of the second planetary gear set 316 with the second node 314B of the first planetary gear set 314. A second clutch 328 selectively connects the input shaft or member 312 and the first node 316A of the second planetary gear set 316 with the third node 314C of the first planetary gear set 314. A third clutch 330 selectively connects the second node 314B of the first planetary gear set 314 with the third node 318C of the third planetary gear set 318. A first brake 232 selectively connects the third node 314C of the first planetary gear set 314 with a ground, a stationary member, or a transmission housing 340. A second brake 234 selectively connects the second node 318B of the third planetary gear set 318 and the second node 316B of the second planetary gear set 316 with the ground, the stationary member, or the transmission housing 340. A third brake 236 selectively connects the third node 318C of the third planetary gear set 318 with the ground, the stationary member, or the transmission housing 340.

Figure 11:
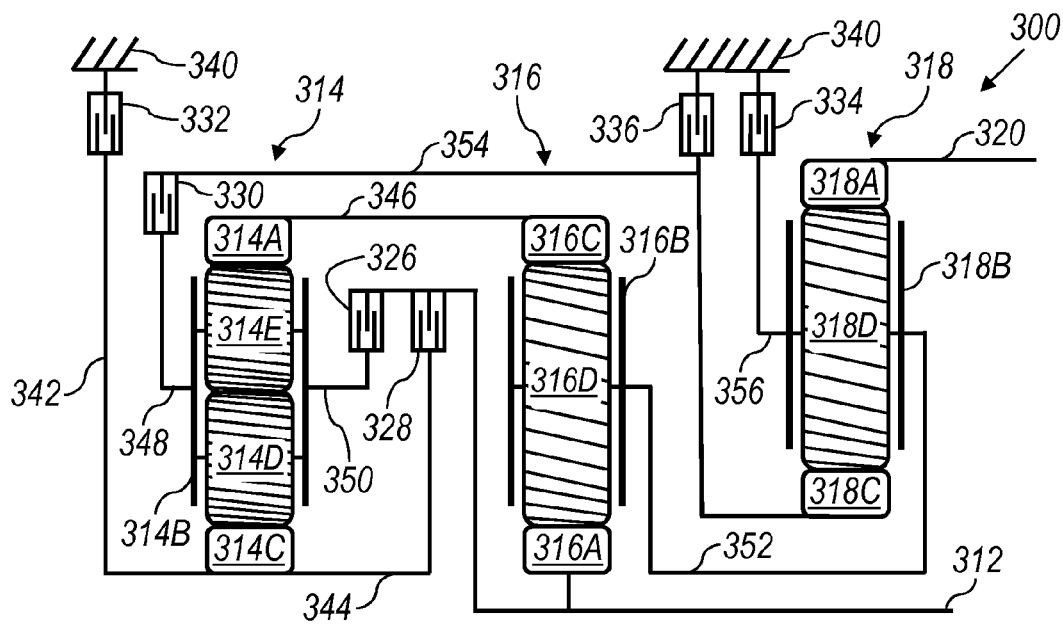
FIG. 11 is a diagrammatic view of an embodiment of an eight speed transmission according to the present invention.

Referring now to FIG. 11, a stick diagram presents a schematic layout of the embodiment of the eight speed transmission 300 according to the present invention. In FIG. 11, the numbering from the lever diagram of FIG. 10 is carried over. The clutches, brakes, and couplings are correspondingly presented whereas the nodes of the planetary gear sets now appear as components of planetary gear sets such as sun gears, ring gears, planet gears and planet gear carriers.

For example, the planetary gear set 314 includes a sun gear member 314C, a ring gear member 314A and a planet gear carrier member 314B that rotatably supports a a first set of planet gears 314D (only one of which is shown) and a second set of planet gears 314E (only one of which is shown). The sun gear member 314C is connected for common rotation with a first shaft or interconnecting member 342 and with a second shaft or interconnecting member 344. The ring gear member 314A is connected for common rotation with a third shaft or interconnecting member 346. The planet carrier member 314B is connected for common rotation with a fourth shaft or interconnecting member 348 and with a fifth shaft or interconnecting member 350. The planet gears 314D are each configured to intermesh with both the sun gear member 314C and the planet gears 314E. The planet gears 314E are each configured to intermesh with both the ring gear member 314A and the planet gears 314D.

The planetary gear set 316 includes a sun gear member 316A, a ring gear member 316C and a planet gear carrier member 316B that rotatably supports a set of planet gears 316D (only one of which is shown). The sun gear member 316A is connected for common rotation with the input shaft or member 312. The ring gear member 316C is connected for common rotation with the third shaft or interconnecting member 346. The planet carrier member 316B is connected for common rotation with a sixth shaft or interconnecting member 352. The planet gears 316D each are configured to intermesh with both the sun gear member 316A and the ring gear member 316C.

The planetary gear set 318 includes a sun gear member 318C, a ring gear member 318A and a planet gear carrier member 318B that rotatably supports a set of planet gears 318D (only one of which is shown). The sun gear member 318C is connected for common rotation with a seventh shaft or interconnecting member 354. The ring gear member 318A is connected for common rotation with the output shaft or member 320. The planet carrier member 318B is connected for common rotation with an eighth shaft or interconnecting member 356 and with the sixth shaft or interconnecting member 352. The planet gears 318D each are configured to intermesh with both the sun gear member 318C and the ring gear member 318A.

The input shaft or member 312 is continuously connected to an engine (not shown) or to a turbine of a torque converter (not shown). The output shaft or member 320 is continuously connected with the final drive unit or transfer case (not shown).

The torque-transmitting mechanisms or clutches 326, 328, 330 and brakes 332, 334, 336 allow for selective interconnection of the shafts or interconnecting members, members of the planetary gear sets and the housing. For example, the first clutch 326 is selectively engageable to connect the fourth shaft or interconnecting member 348 and the fifth shaft or interconnecting member 350 with the input shaft or member 312. The second clutch 328 is selectively engageable to connect the first shaft or interconnecting member 342 and the second shaft or interconnecting member 344 with the input shaft or member 312. The third clutch 330 is selectively engageable to connect the fourth shaft or interconnecting member 348 and the fifth shaft or interconnecting member 350 with the seventh shaft or interconnecting member 354. The first brake 332 is selectively engageable to connect the first shaft or interconnecting member 342 and the second shaft or interconnecting member 344 with the stationary member or the transmission housing 340 in order to restrict the members 342, 344 from rotating relative to the transmission housing 340. The second brake 334 is selectively engageable to connect the sixth shaft or interconnecting member 352 and the eighth shaft or interconnecting member 356 with the stationary member or the transmission housing 340 in order to restrict the members 352, 356 from rotating relative to the transmission housing 340. The third brake 336 is selectively engageable to connect the seventh shaft or interconnecting member 354 with the stationary member or the transmission housing 340 in order to restrict the member 354 from rotating relative to the transmission housing 340.

Referring now to FIG. 11 and FIG. 12, the operation of the embodiment of the eight speed transmission 300 will be described. It will be appreciated that transmission 300 is capable of transmitting torque from the input shaft or member 312 to the output shaft or member 320 in at least eight forward speed or torque ratios and at least one reverse speed or torque ratio with a double overdrive. Each forward and reverse speed or torque ratio is attained by engagement of one or more of the torque-transmitting mechanisms (i.e. first clutch 326, second clutch 328, third clutch 330, first brake 332, second brake 334, and third brake 336), as will be explained below. The 2-3, 4-5, and 6-7 shifts are double transition shifts requiring two torque transmitting mechanisms to release and two different torque transmitting mechanisms to apply. FIG. 12 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 300. An example of the gear ratios that may be obtained using the embodiments of the present invention are also shown in FIG. 12. Of course, other gear ratios are achievable depending on the gear diameter, gear teeth count and gear configuration selected.

To establish a reverse gear, the first clutch 326, the third clutch 330, and the second brake 334 are engaged or activated. The first clutch 326 connects the fourth shaft or interconnecting member 348 and the fifth shaft or interconnecting member 350 with the input shaft or member 312. The third clutch 330 connects the fourth shaft or interconnecting member 348 and the fifth shaft or interconnecting member 350 with the seventh shaft or interconnecting member 354. The second brake 334 connects the sixth shaft or interconnecting member 352 and the eighth shaft or interconnecting member 356 with the stationary member or the transmission housing 340 in order to restrict the members 352, 356 from rotating relative to the transmission housing 340. Likewise, the eight forward ratios are achieved through different combinations of clutch and brake engagement, as shown in FIG. 12.

It will be appreciated that the foregoing explanation of operation and gear states of the eight speed transmission 300 assumes, first of all, that all the clutches or brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Figure 13:
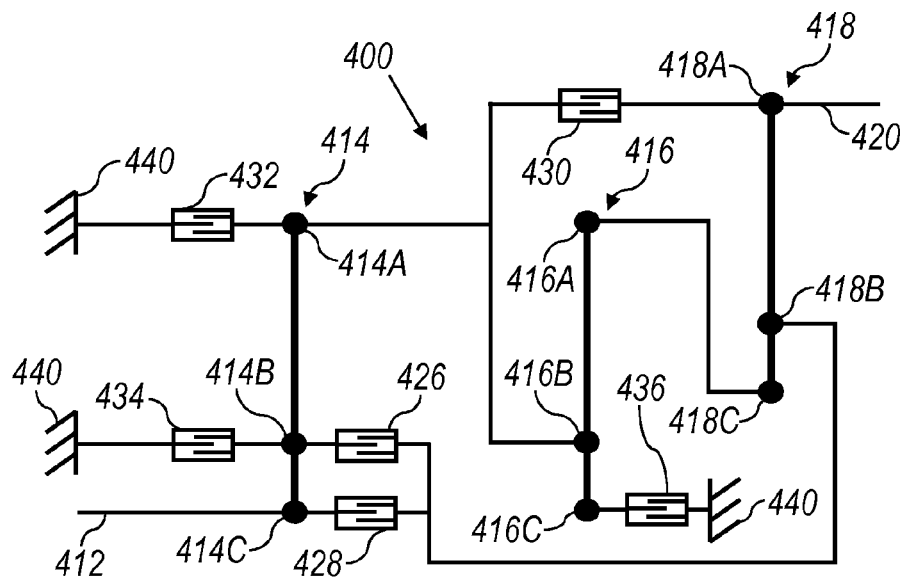
FIG. 13 is a lever diagram of an embodiment of an eight speed transmission according to the present invention.

Referring now to FIG. 13, yet another embodiment of an eight speed transmission 400 is illustrated in a lever diagram format. The transmission 400 includes an input shaft or member 412, a first planetary gear set 414 having three nodes: a first node 414A, a second node 414B and a third node 414C, a second planetary gear set 416 having three nodes: a first node 416A, a second node 416B and a third node 416C, a third planetary gear set 418 having three nodes: a first node 418A, a second node 418B and a third node 418C, and an output shaft or member 420.

The input shaft or member 412 is coupled to the third node 414C of the first planetary gear set 414. The output shaft or member 420 is coupled to the first node 418A of the third planetary gear set 418. The first node 414A of the first planetary gear set 414 is coupled to the second node 416B of the second planetary gear set 416. The first node 416A of the second planetary gear set 416 is coupled to the third node 418C of the third planetary gear set 418.

A first clutch 426 selectively connects the second node 414B of the first planetary gear set 414 with the second node 418B of the third planetary gear set 418. A second clutch 428 selectively connects the input shaft or member 412 and the third node 414C of the first planetary gear set 414 with the second node 418B of the third planetary gear set 418. A third clutch 430 selectively connects the first node 414A of the first planetary gear set 414 and the second node 416B of the second planetary gear set 416 with the first node 418A of the third planetary gear set 418 and the output shaft or member 420. A first brake 432 selectively connects the first node 414A of the first planetary gear set 414 and the second node 416B of the second planetary gear set 416 with a ground, a stationary member, or a transmission housing 440. A second brake 434 selectively connects the second node 414B of the first planetary gear set 414 with the ground, the stationary member, or the transmission housing 440. A third brake 436 selectively connects the third node 416C of the second planetary gear set 416 with the ground, the stationary member, or the transmission housing 440.

Figure 14:
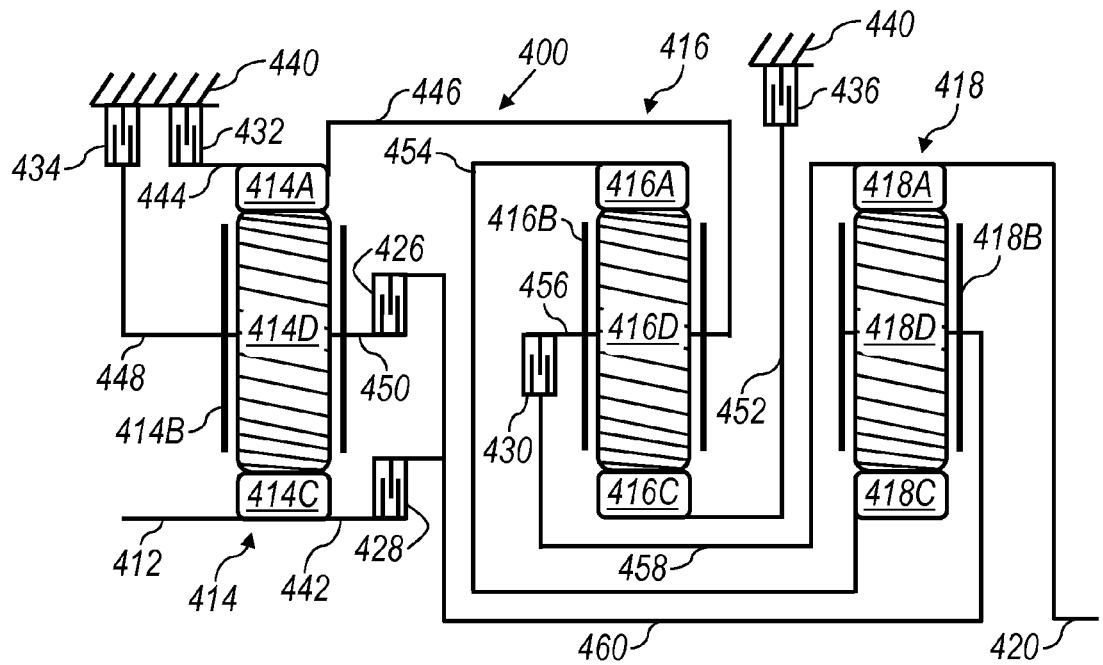
FIG. 14 is a diagrammatic view of an embodiment of an eight speed transmission according to the present invention.

Referring now to FIG. 14, a stick diagram presents a schematic layout of the embodiment of the eight speed transmission 400 according to the present invention. In FIG. 14, the numbering from the lever diagram of FIG. 13 is carried over. The clutches, brakes, and couplings are correspondingly presented whereas the nodes of the planetary gear sets now appear as components of planetary gear sets such as sun gears, ring gears, planet gears and planet gear carriers.

For example, the planetary gear set 414 includes a sun gear member 414C, a ring gear member 414A and a planet gear carrier member 414B that rotatably supports a set of planet gears 414D (only one of which is shown). The sun gear member 414C is connected for common rotation with a first shaft or interconnecting member 442 and with the input shaft or member 412. The ring gear member 414A is connected for common rotation with a second shaft or interconnecting member 444 and a third shaft or interconnecting member 446. The planet carrier member 414B is connected for common rotation with a fourth shaft or interconnecting member 448 and with a fifth shaft or interconnecting member 450. The planet gears 414D each are configured to intermesh with both the sun gear member 414C and the ring gear member 414A.

The planetary gear set 416 includes a sun gear member 416C, a ring gear member 416A and a planet gear carrier member 416B that rotatably supports a set of planet gears 416D (only one of which is shown). The sun gear member 416C is connected for common rotation with a sixth shaft or interconnecting member 452. The ring gear member 416A is connected for common rotation with a seventh shaft or interconnecting member 454. The planet carrier member 416B is connected for common rotation with an eighth shaft or interconnecting member 456 and the third shaft or interconnecting member 446. The planet gears 416D each are configured to intermesh with both the sun gear member 416C and the ring gear member 416A.

The planetary gear set 418 includes a sun gear member 418C, a ring gear member 418A and a planet gear carrier member 418B that rotatably supports a set of planet gears 418D (only one of which is shown). The sun gear member 418C is connected for common rotation with the seventh shaft or interconnecting member 454. The ring gear member 418A is connected for common rotation with the output shaft or member 420 and a ninth shaft or interconnecting member 458. The planet carrier member 418B is connected for common rotation with a tenth shaft or interconnecting member 460. The planet gears 418D each are configured to intermesh with both the sun gear member 418C and the ring gear member 418A.

The input shaft or member 412 is continuously connected to an engine (not shown) or to a turbine of a torque converter (not shown). The output shaft or member 420 is continuously connected with the final drive unit or transfer case (not shown).

The torque-transmitting mechanisms or clutches 426, 428, 430 and brakes 432, 434, 436 allow for selective interconnection of the shafts or interconnecting members, members of the planetary gear sets and the housing. For example, the first clutch 426 is selectively engageable to connect the fourth shaft or interconnecting member 448 and the fifth shaft or interconnecting member 450 with the tenth shaft or interconnecting member 460. The second clutch 428 is selectively engageable to connect the first shaft or interconnecting member 442 and the input shaft or member 412 with the tenth shaft or interconnecting member 460. The third clutch 430 is selectively engageable to connect the ninth shaft or interconnecting member 458 and the output shaft or member 420 with the eighth shaft or interconnecting member 456. The first brake 432 is selectively engageable to connect the second shaft or interconnecting member 444 with the stationary member or the transmission housing 440 in order to restrict the member 444 from rotating relative to the transmission housing 440. The second brake 434 is selectively engageable to connect the fourth shaft or interconnecting member 448 with the stationary member or the transmission housing 440 in order to restrict the member 448 from rotating relative to the transmission housing 440. The third brake 436 is selectively engageable to connect the sixth shaft or interconnecting member 452 with the stationary member or the transmission housing 440 in order to restrict the member 452 from rotating relative to the transmission housing 440.

Referring now to FIG. 14 and FIG. 15, the operation of the embodiment of the eight speed transmission 400 will be described. It will be appreciated that transmission 400 is capable of transmitting torque from the input shaft or member 412 to the output shaft or member 420 in at least eight forward speed or torque ratios and at least one reverse speed or torque ratio with a double overdrive. Each forward and reverse speed or torque ratio is attained by engagement of one or more of the torque-transmitting mechanisms (i.e. first clutch 426, second clutch 428, third clutch 430, first brake 432, second brake 434, and third brake 436), as will be explained below. The 6-7 shift is a double transition shift requiring two torque transmitting mechanisms to release and two different torque transmitting mechanisms to apply. FIG. 15 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 400. An example of the gear ratios that may be obtained using the embodiments of the present invention are also shown in FIG. 15. Of course, other gear ratios are achievable depending on the gear diameter, gear teeth count and gear configuration selected.

To establish a reverse gear, the third clutch 430, the second brake 434, and the third brake 436 are engaged or activated. The third clutch 430 connects the ninth shaft or interconnecting member 458 and the output shaft or member 420 with the eighth shaft or interconnecting member 456. The second brake 434 connects the fourth shaft or interconnecting member 448 with the stationary member or the transmission housing 440 in order to restrict the member 448 from rotating relative to the transmission housing 440. The third brake 436 connects the sixth shaft or interconnecting member 452 with the stationary member or the transmission housing 440 in order to restrict the member 452 from rotating relative to the transmission housing 440. Likewise, the eight forward ratios are achieved through different combinations of clutch and brake engagement, as shown in FIG. 15.

It will be appreciated that the foregoing explanation of operation and gear states of the eight speed transmission 400 assumes, first of all, that all the clutches or brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Figure 16:
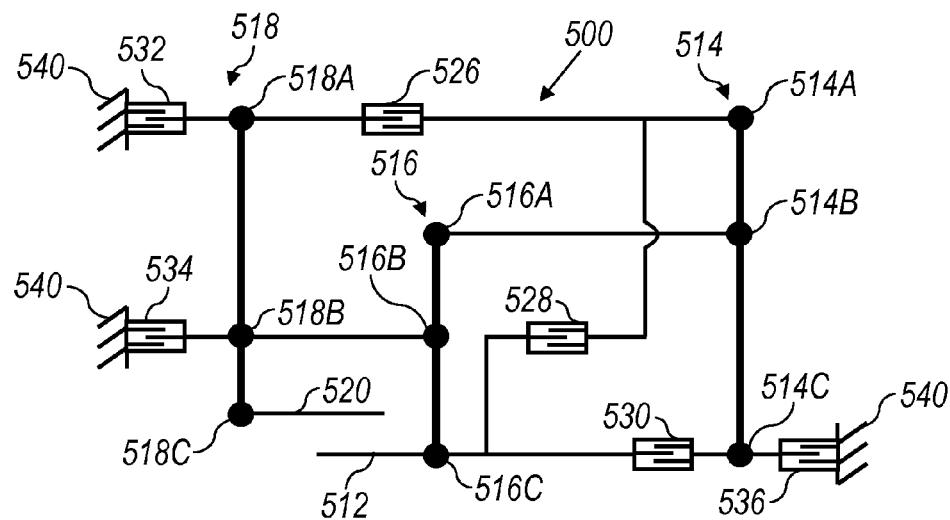
FIG. 16 is a lever diagram of an embodiment of an eight speed transmission according to the present invention.

Referring now to FIG. 16, yet another embodiment of an eight speed transmission 500 is illustrated in a lever diagram format. The transmission 500 includes an input shaft or member 512, a first planetary gear set 514 having three nodes: a first node 514A, a second node 514B and a third node 514C, a second planetary gear set 516 having three nodes: a first node 516A, a second node 516B and a third node 516C, a third planetary gear set 518 having three nodes: a first node 518A, a second node 518B and a third node 518C, and an output shaft or member 520.

The input shaft or member 512 is coupled to the third node 516C of the second planetary gear set 516. The output shaft or member 520 is coupled to the third node 518C of the third planetary gear set 518. The second node 518B of the third planetary gear set 518 is coupled to the second node 516B of the second planetary gear set 516. The first node 516A of the second planetary gear set 516 is coupled to the second node 514B of the first planetary gear set 514.

A first clutch 526 selectively connects the first node 518A of the third planetary gear set 518 with the first node 514A of the first planetary gear set 514. A second clutch 528 selectively connects the input shaft or member 512 and the third node 516C of the second planetary gear set 516 with the first node 514A of the first planetary gear set 514. A third clutch 530 selectively connects the input shaft or member 512 and the third node 516C of the second planetary gear set 516 with the third node 514C of the first planetary gear set 514. A first brake 532 selectively connects the first node 518A of the third planetary gear set 518 with a ground, a stationary member, or a transmission housing 540. A second brake 534 selectively connects the second node 518B of the third planetary gear set 518 and the second node 516B of the second planetary gear set 516 with the ground, the stationary member, or the transmission housing 540. A third brake 536 selectively connects the third node 514C of the first planetary gear set 514 with the ground, the stationary member, or the transmission housing 540.

Figure 17:
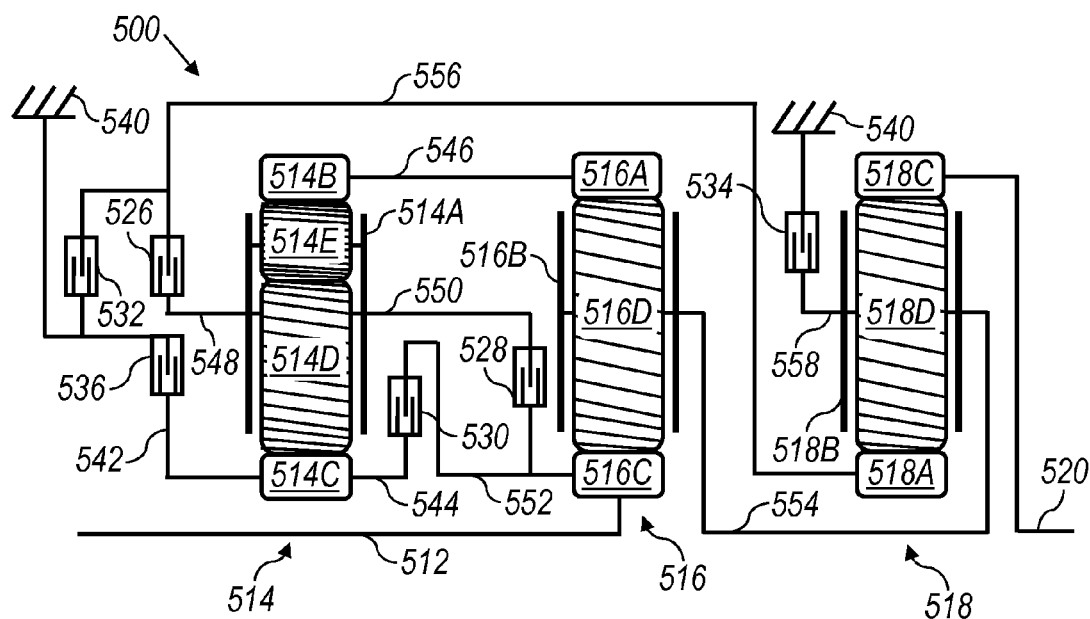
FIG. 17 is a diagrammatic view of an embodiment of an eight speed transmission according to the present invention.

Referring now to FIG. 17, a stick diagram presents a schematic layout of the embodiment of the eight speed transmission 500 according to the present invention. In FIG. 17, the numbering from the lever diagram of FIG. 16 is carried over. The clutches, brakes, and couplings are correspondingly presented whereas the nodes of the planetary gear sets now appear as components of planetary gear sets such as sun gears, ring gears, planet gears and planet gear carriers.

For example, the planetary gear set 514 includes a sun gear member 514C, a ring gear member 514B and a planet gear carrier member 514A that rotatably supports a first set of planet gears 514D (only one of which is shown) and a second set of planet gears 514E (only one of which is shown). The sun gear member 514C is connected for common rotation with a first shaft or interconnecting member 542 and with a second shaft or interconnecting member 544. The ring gear member 514B is connected for common rotation with a third shaft or interconnecting member 546. The planet carrier member 514A is connected for common rotation with a fourth shaft or interconnecting member 548 and with a fifth shaft or interconnecting member 550. The first set of planet gears 514D each are configured to intermesh with both the sun gear member 514C and the second set of planet gears 514E. The second set of planet gears 514E each are configured to intermesh with both the first set of planet gears 514D and the ring gear member 514B.

The planetary gear set 516 includes a sun gear member 516C, a ring gear member 516A and a planet gear carrier member 516B that rotatably supports a set of planet gears 516D (only one of which is shown). The sun gear member 516C is connected for common rotation with the input shaft or member 512 and a sixth shaft or interconnecting member 552. The ring gear member 516A is connected for common rotation with the third shaft or interconnecting member 546. The planet carrier member 516B is connected for common rotation with a seventh shaft or interconnecting member 554. The planet gears 516D each are configured to intermesh with both the sun gear member 516C and the ring gear member 516A.

The planetary gear set 518 includes a sun gear member 518A, a ring gear member 518C and a planet gear carrier member 518B that rotatably supports a set of planet gears 518D (only one of which is shown). The sun gear member 518A is connected for common rotation with an eighth shaft or interconnecting member 556. The ring gear member 518C is connected for common rotation with the output shaft or member 520. The planet carrier member 518B is connected for common rotation with a ninth shaft or interconnecting member 558 and with the seventh shaft or interconnecting member 554. The planet gears 518D each are configured to intermesh with both the sun gear member 518A and the ring gear member 518C.

The input shaft or member 512 is continuously connected to an engine (not shown) or to a turbine of a torque converter (not shown). The output shaft or member 520 is continuously connected with the final drive unit or transfer case (not shown).

The torque-transmitting mechanisms or clutches 526, 528, 530 and brakes 532, 534, 536 allow for selective interconnection of the shafts or interconnecting members, members of the planetary gear sets and the housing. For example, the first clutch 526 is selectively engageable to connect the fourth shaft or interconnecting member 548 with the eighth shaft or interconnecting member 556. The second clutch 528 is selectively engageable to connect the sixth shaft or interconnecting member 552 with the fifth shaft or interconnecting member 550. The third clutch 530 is selectively engageable to connect the second shaft or interconnecting member 544 with the sixth shaft or interconnecting member 552. The first brake 532 is selectively engageable to connect the eighth shaft or interconnecting member 556 with the stationary member or the transmission housing 540 in order to restrict the member 556 from rotating relative to the transmission housing 540. The second brake 534 is selectively engageable to connect the ninth shaft or interconnecting member 558 with the stationary member or the transmission housing 540 in order to restrict the member 558 from rotating relative to the transmission housing 540. The third brake 536 is selectively engageable to connect the first shaft or interconnecting member 542 with the stationary member or the transmission housing 540 in order to restrict the member 542 from rotating relative to the transmission housing 540.

Referring now to FIG. 17 and FIG. 18, the operation of the embodiment of the eight speed transmission 500 will be described. It will be appreciated that transmission 500 is capable of transmitting torque from the input shaft or member 512 to the output shaft or member 520 in at least eight forward speed or torque ratios and at least one reverse speed or torque ratio with a double overdrive. Each forward and reverse speed or torque ratio is attained by engagement of one or more of the torque-transmitting mechanisms (i.e. first clutch 526, second clutch 528, third clutch 530, first brake 532, second brake 534, and third brake 536), as will be explained below. The 2-3, 4-5, and 6-7 shifts are double transition shifts requiring two torque transmitting mechanisms to release and two different torque transmitting mechanisms to apply. FIG. 18 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 500. An example of the gear ratios that may be obtained using the embodiments of the present invention are also shown in FIG. 18. Of course, other gear ratios are achievable depending on the gear diameter, gear teeth count and gear configuration selected.

To establish a reverse gear, the first clutch 526, the second clutch 528, and the second brake 534 are engaged or activated. The first clutch 526 connects the fourth shaft or interconnecting member 548 with the eighth shaft or interconnecting member 556. The second clutch 528 connects the sixth shaft or interconnecting member 552 with the fifth shaft or interconnecting member 550. The second brake 534 connects the ninth shaft or interconnecting member 558 with the stationary member or the transmission housing 540 in order to restrict the member 558 from rotating relative to the transmission housing 540. Likewise, the eight forward ratios are achieved through different combinations of clutch and brake engagement, as shown in FIG. 18.

It will be appreciated that the foregoing explanation of operation and gear states of the eight speed transmission 500 assumes, first of all, that all the clutches or brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
    an input member;
    an output member;
    first, second, and third planetary gear sets each having first, second and third members, wherein the input member is continuously interconnected to the third member of the first planetary gear set and the output member is continuously interconnected to the third member of the third planetary gear set;
    a first interconnecting member continuously interconnecting the first member of the first planetary gear set with the second member of the second planetary gear set;
    a second interconnecting member continuously interconnecting the third member of the second planetary gear set with the first member of the third planetary gear set;
    six torque transmitting mechanisms each selectively engageable to interconnect one of the first, second, and third members of the planetary gear sets with another one of the first, second, and third members of the planetary gear sets, and a stationary member;
    a first of the six torque transmitting mechanisms is selectively engageable to interconnect the third member of the second planetary gear set and the first member of the third planetary gear set with the first member of the second planetary gear set; and
    wherein the torque transmitting mechanisms are selectively engageable in combinations of at least three to establish a plurality of forward speed ratios and at least one reverse speed ratio between the input member and the output member.

2. The transmission of claim 1 wherein a second of the six torque transmitting mechanisms is selectively engageable to interconnect the third member of the first planetary gear set with the second member of the third planetary gear set.

3. The transmission of claim 2 wherein a third of the six torque transmitting mechanisms is selectively engageable to interconnect the second member of the first planetary gear set with the third member of the second planetary gear set and the first member of the fourth planetary gear set.

4. The transmission of claim 3 wherein a fourth of the six torque transmitting mechanisms is selectively engageable to interconnect the second member of the first planetary gear set with the second member of the third planetary gear set.

5. The transmission of claim 4 wherein a fifth of the six torque transmitting mechanisms is selectively engageable to interconnect the first member of the second planetary gear set with a stationary member.

6. The transmission of claim 5 wherein a sixth of the six torque transmitting mechanisms is selectively engageable to interconnect the second member of the third planetary gear set with the stationary member.

7. The transmission of claim 1 wherein the third member of the first planetary gear set and the first members of the second and third planetary gear sets are sun gears, the second members of the first, second and third planetary gear sets are carrier members, and the third members of the second and third planetary gear sets and the first member of the first planetary gear set are ring gears.

8. A transmission comprising:
an input member;
an output member;
first, second, and third planetary gear sets each having a first, a second, and a third member;
a first interconnecting member continuously interconnecting the first member of the first planetary gear set with the second member of the second planetary gear set;
a second interconnecting member continuously interconnecting the third member of the second planetary gear set with the first member of the third planetary gear set;
a first torque transmitting mechanism selectively engageable to interconnect at least one of the third member of the first planetary gear set and the input member with the second member of the third planetary gear set;
a second torque transmitting mechanism selectively engageable to interconnect the second member of the first planetary gear set with at least one of the third member of the second planetary gear set and the first member of the third planetary gear set;
a third torque transmitting mechanism selectively engageable to interconnect the second member of the first planetary gear set with the second member of the third planetary gear set;
a fourth torque transmitting mechanism selectively engageable to interconnect at least one of the third member of the second planetary gear set and the first member of the third planetary gear set with the first member of the second planetary gear set;
a fifth torque transmitting mechanism selectively engageable to interconnect the first member of the second planetary gear set with a stationary member; and
a sixth torque transmitting mechanism selectively engageable to interconnect the second member of the third planetary gear set with the stationary member, and
wherein the torque transmitting mechanisms are selectively engageable in combinations of at least three to establish a plurality of forward speed ratios and at least one reverse speed ratio between the input member and the output member.

9. The transmission of claim 8 wherein the input member is continuously interconnected to the third member of the first planetary gear set and the output member is continuously interconnected to the third member of the third planetary gear set.

10. The transmission of claim 9 wherein the third member of the first planetary gear set and the first members of the second and third planetary gear sets are sun gears, the second members of the first, second and third planetary gear sets are carrier members, and the third members of the second and third planetary gear sets and the first member of the first planetary gear set are ring gears.

11. A transmission comprising:
an input member;
an output member;
first, second, and third planetary gear sets each having a first, a second, and a third member;
a plurality of interconnecting members each drivingly connecting one of the first, second, and third members of the planetary gear sets with another one of the first, second, and third members of the planetary gears sets;
a first torque transmitting mechanism selectively engageable to interconnect at least one of the third member of the first planetary gear set and the input member with the second member of the third planetary gear set;
a second torque transmitting mechanism selectively engageable to interconnect the second member of the first planetary gear set with at least one of the third member of the second planetary gear set and the first member of the third planetary gear set;
a third torque transmitting mechanism selectively engageable to interconnect the second member of the first planetary gear set with the second member of the third planetary gear set;
a fourth torque transmitting mechanism selectively engageable to interconnect at least one of the third member of the second planetary gear set and the first member of the third planetary gear set with the first member of the second planetary gear set;
a fifth torque transmitting mechanism selectively engageable to interconnect the first member of the second planetary gear set with a stationary member; and
a sixth torque transmitting mechanism selectively engageable to interconnect the second member of the third planetary gear set with the stationary member, and
wherein the torque transmitting mechanisms are selectively engageable in combinations of at least three to establish a plurality of forward speed ratios and at least one reverse speed ratio between the input member and the output member.

12. The transmission of claim 11 wherein a first of a plurality of interconnecting member continuously interconnects the first member of the first planetary gear set with the second member of the second planetary gear set.

13. The transmission of claim 12 wherein a second of the plurality of interconnecting members continuously interconnects the third member of the second planetary gear set with the first member of the third planetary gear set.

14. The transmission of claim 13 wherein the input member is continuously interconnected to the third member of the first planetary gear set and the output member is continuously interconnected to the third member of the third planetary gear set.

15. The transmission of claim 14 wherein the third member of the first planetary gear set and the first members of the second and third planetary gear sets are sun gears, the second members of the first, second and third planetary gear sets are carrier members, and the third members of the second and third planetary gear sets and the first member of the first planetary gear set are ring gears.

* * * * *